United States Patent
Beehler

[11] Patent Number: 5,993,871
[45] Date of Patent: Nov. 30, 1999

[54] STABLE, SELF-SUPPORTING TACO SHELL

[76] Inventor: Elden D. Beehler, 3930 42nd St., S.E., Grandville, Mich. 49418

[21] Appl. No.: 09/042,751

[22] Filed: Mar. 17, 1998

[51] Int. Cl.[6] .............................. A21D 13/00; A23L 1/10
[52] U.S. Cl. ........................ 426/138; 426/94; 426/144; 426/391; 426/502
[58] Field of Search ................................. 426/138, 139, 426/94, 391, 502, 144; D1/122, 123, 124, 125, 130, 199; 229/938, 104; 220/608, 628, 635; 99/426, 439, 428

[56] References Cited

U.S. PATENT DOCUMENTS

| | | | |
|---|---|---|---|
| D. 64,882 | 6/1924 | Winder | D1/122 |
| D. 82,526 | 11/1930 | Siciliani | D1/122 |
| D. 83,609 | 3/1931 | Hamwi | D1/122 |
| D. 166,524 | 4/1952 | Blish | D1/122 |
| D. 192,375 | 3/1962 | Bowl | D7/504 |
| D. 259,670 | 6/1981 | De Leon | 426/138 |
| D. 277,234 | 1/1985 | Bank | 426/138 |
| D. 278,199 | 4/1985 | Richards | D7/504 |
| D. 316,622 | 5/1991 | Popiel | 426/138 |
| D. 376,893 | 12/1996 | Gornet | 426/138 |
| D. 377,257 | 1/1997 | Calvin | D1/101 |
| 3,653,337 | 4/1972 | Hanson | 426/138 |
| 4,573,579 | 3/1986 | Murdick | 229/938 |
| 5,002,783 | 3/1991 | Ruiz | 426/138 |
| 5,236,727 | 8/1993 | Huston | 426/138 |
| 5,423,452 | 6/1995 | Tardif | 220/608 |

FOREIGN PATENT DOCUMENTS

| | | | |
|---|---|---|---|
| 541401 | 5/1957 | Canada | 220/635 |
| 840634 | 7/1960 | United Kingdom | 220/635 |

OTHER PUBLICATIONS (One copy of an Old El Paso taco shell box, which was purchased more than one year before the filing of the present application.) Photocopy of Old El Paso Taco Shell Box –No Date Given.

*Primary Examiner*—Steven Weinstein
*Attorney, Agent, or Firm*—Van Dyke, Gardner, Linn & Burkhart, LLP

[57] ABSTRACT

An edible food container which is self supporting and stable in a generally upright position when placed on a rigid and substantially planar support surface. The edible food container includes a pair of spaced apart side walls and a base connecting the side walls. The base includes at least two spaced apart line bearing contact surfaces for supporting the edible food container on the substantially planar surface. Preferably, the base includes at least two elongate spaced apart ribs which define the at least two line bearing contact surfaces. The base may further include a raised portions on both ends of the base to increase the ability of the food container to hold fillings therein.

8 Claims, 2 Drawing Sheets

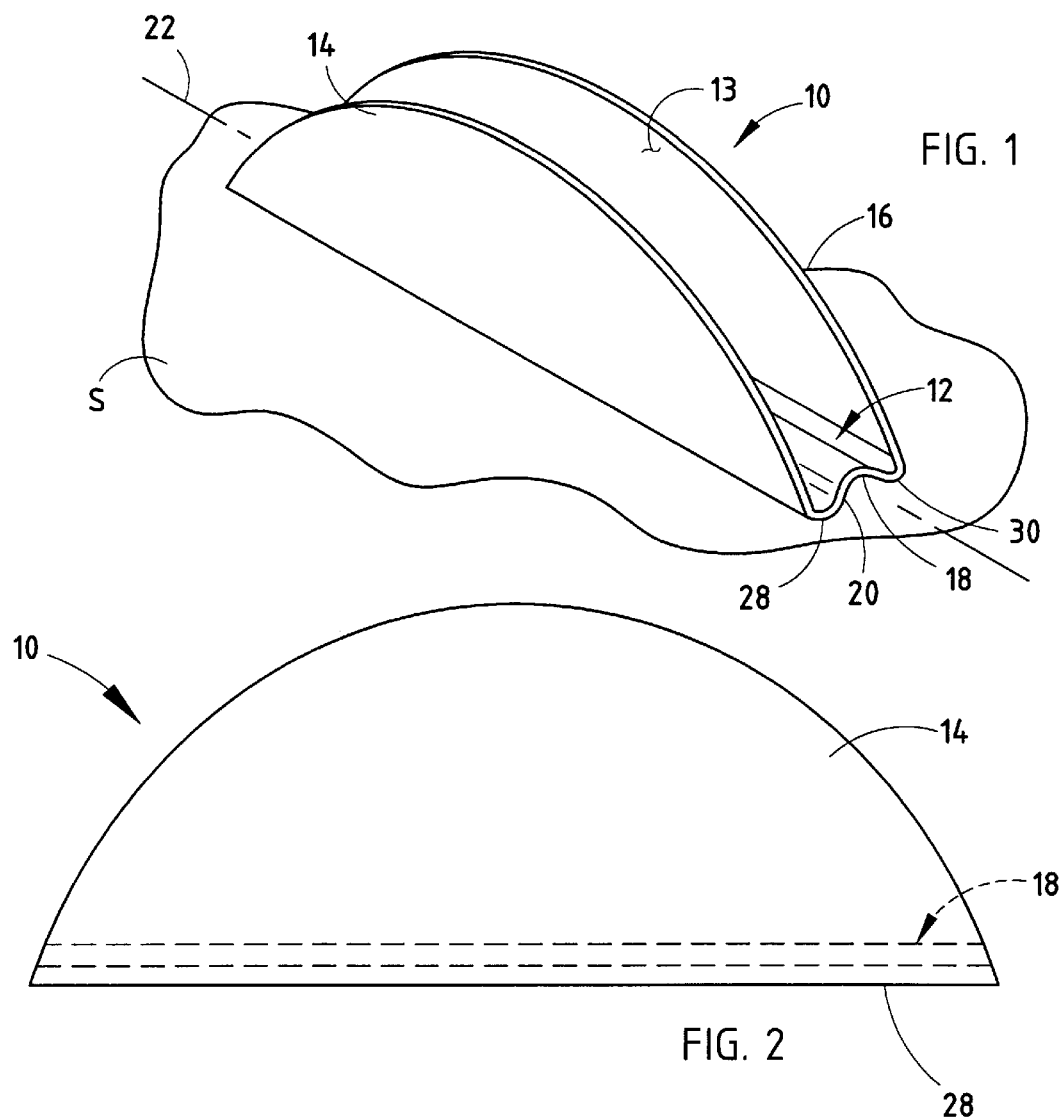
FIG. 1
FIG. 2
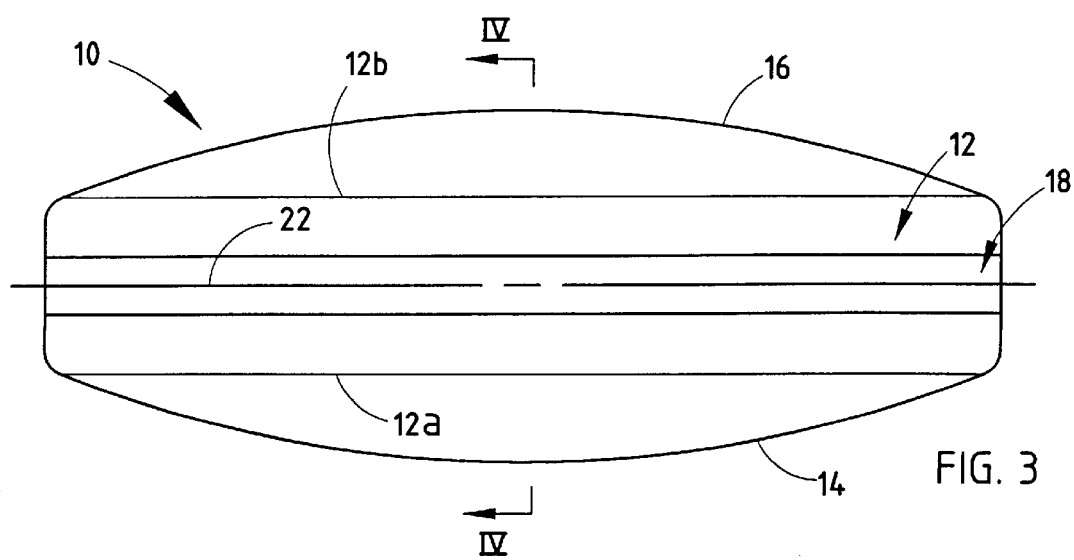
FIG. 3

5,993,871

STABLE, SELF-SUPPORTING TACO SHELL

TECHNICAL FIELD AND BACKGROUND OF THE INVENTION

The present invention relates to an edible food shell and, more particularly, to an edible taco shell.

Conventional taco shells are formed from a circular tortilla, which is bent and then cooked, for example by baking, in order to form a shell that is generally rigid and holds its generally U-shaped configuration so that it can be filled with a taco filling for consumption. Before cooking, the tortilla is placed in a "mold" which bends the tortilla about a central portion to form a pair of opposed and spaced apart side walls. The side walls are interconnected by a generally semi-circular or round base to thereby define a cavity in which the taco filling, such as lettuce, beans, cooked meat or poultry or the like, is placed. Consequently, the taco shell is not stable in the vertical position and must be laid on one of its sides to prevent the taco shell from tipping over. However, when the taco shell is on its side, the taco shell can no longer hold the taco filling, which falls out through the open mouth of the taco shell.

In order to hold taco shells upright, various taco shell holders have been devised. Typically, the taco shell holder has a body with a wide base and a taco shell receiving opening in which the taco shell sits while it is filled with the taco filling and from which it is subsequently removed for consumption. However, the taco shell holders are not edible and, therefore, generate a significant amount of waste. Furthermore, in the fast-food-take-out environment, taco shell holders make it difficult to package the taco shell when the taco shell is filled with taco shell filling.

Proposals have been made to modify the conventional taco shell to include a generally flat based taco shell. Flat based taco shells have heretofore not provided the stability or strength required for taco shell manufactures due to the high stresses concentration factors associated with the sharp corners at the base of the taco shell. Furthermore, due to the variation in the surface topology of taco shells, the flat base shell does not provide coplanar support points and, instead, provides a plurality of support points at different elevations which causes the taco shell to be unstable when it is supported by its base.

Consequently, there is a need for a taco shell which is self supporting and can assume a generally upright position so that the taco filling will generally remain in the taco shell.

SUMMARY OF THE INVENTION

Accordingly, the present invention provides an improved taco shell in which the taco shell is self-supporting and stable when positioned in an upright position on a generally planar surface. This function is provided by a base that is adapted to provide a stable support for the taco shell whether the shell is filled or not.

According to one aspect of the invention, an edible food container includes first and second sides and a base which connects the first and second sides to form a generally U-shaped holder. The base includes at least two spaced apart line bearing contact surfaces for supporting the edible food container in a generally upright position on a substantially planar surface.

In one form, the base includes a pair of elongate spaced apart ribs, which define the pair of generally parallel line bearing contact surfaces. In another form, the base includes a generally raised portion intermediate the generally parallel line bearing contact surfaces, for example a central raised arcuate rib. The raised arcuate rib preferably extends substantially along longitudinal extent of the base.

According to another aspect of the invention, a taco shell includes a pair of spaced apart arcuate sides and a base which connects the arcuate sides together. The base includes a pair of spaced apart longitudinal ribs.

In one form, the longitudinal ribs are generally substantially parallel to a longitudinal axis of the base. In other aspects, the ribs include a curvilinear cross-section. For example, a curvilinear cross-section with a substantially uniformly radiused curvature.

According to another aspect of the invention, a taco shell includes a pair of spaced apart side walls and a base which connects the side walls. The base includes an undulating cross-section and defines at least two support surfaces.

In one form, the support surface is comprised of a pair of longitudinally extending ribs.

As will be understood, the taco shell of the present invention provides numerous advantages over the prior known taco shells and taco shell holders. The taco shell is self-supporting and is stable in a generally upright position when placed on a substantially planar support surface. Consequently, the taco shell eliminates the need for a separate taco holder and the associated costs and waste of conventional taco shell holders.

These and other objects, advantages, purposes and features of the invention will become more apparent from the study of the following description taken in conjunction with the drawings.

THE DESCRIPTION OF THE DRAWINGS

FIG. 1 is a perspective view of a taco shell of the present invention;

FIG. 2 is a side view of the taco shell of FIG. 1;

FIG. 3 is a top plan view of the taco shell of FIG. 1;

DESCRIPTION OF THE PREFERRED EMBODIMENTS

Referring to FIGS. 1–4, a taco shell 10 of the present invention is shown which includes a new and improved base 12 with an undulating cross-section, which permits taco shell 10 to be self supporting and to stand generally vertical on a generally horizontal and substantially planar support surface without assistance. Taco shell 10, therefore, eliminates the unnecessary waste associated with conventional taco shell holders and yet provides the same benefits of the taco shell holders by having a taco shell which can remain generally vertical and so that the taco shell can hold the taco filling in side the taco shell before consumption.

Taco shell 10 is formed from a conventional, generally circular tortilla, for example a flour or corn tortilla or the like, which is then formed, for example in a mold, to assume the shape illustrated in FIG. 1, and then cooked, for example by baking. Taco shell 10 includes a pair of spaced apart semi-circular side walls 14 and 16 which extend from opposed sides 12a and 12b of base 12, respectively. Side walls 14 and 16 project upward from base 12. preferably at an angle in a range of about 90 degrees to about 115 degrees with respect to base 12 as measured by the angle designated by the letter "A" in FIG. 4.

Figure 4:
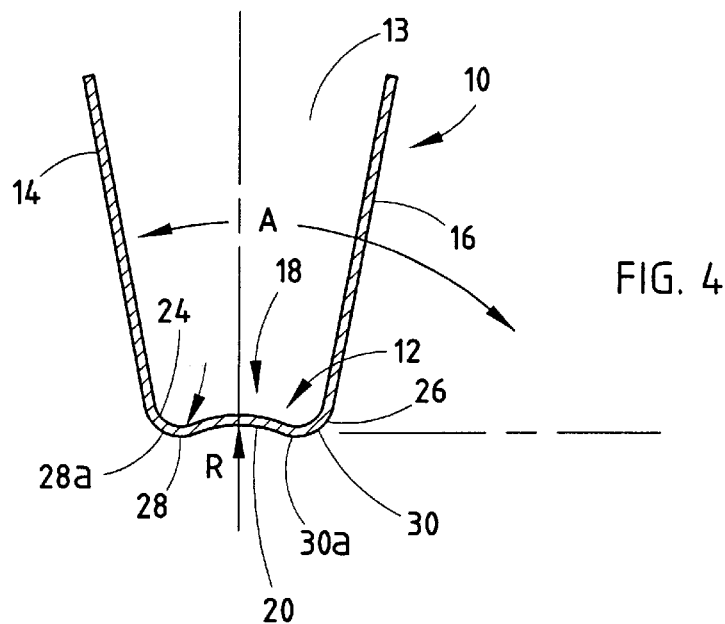
FIG. 4 is a cross sectional view taken along line IV—IV of FIG. 3.

As best seen in FIG. 1 and 4, base 12 includes a raised portion 18, which forms an elongated arcuate rib 20 inside the cavity 13 defined between side walls 14 and 16. Rib 20 is preferably generally centrally located on base 12 and preferably extends along the full longitudinal extent of base 12. Moreover, rib 20 is preferably generally parallel to a longitudinal axis 22 of base 12 (FIG. 1). Rib 20 may include a uniformly radiused cross-section or may include a varied radiused cross-section. Furthermore, the radius of arcuate rib 20 may be varied according to the size of the taco shell. For example, referring to FIG. 4, radius "R" of arcuate rib (20) may be in a range of about ¾ inch to about 1 inch for a regular size taco shell, for example a 5 to 5½ inch long taco shell.

In addition, base 12 includes curved or radiused connecting portions or members 24 and 26 which interconnect arcuate rib 20 and side walls 14 and 16, respectively. Radiused connecting members 24 and 26 preferably extend the full longitudinal extent of base 12 and are generally parallel to longitudinal axis 22 and rib 20. Again, the radius or radii of curvature of connecting members 24 and 26 may be varied and may include, for example, radiuses in a range of about $^{12}/_{128}$th of an inch to about $^{26}/_{128}$th of an inch for a regular size taco shell. It should be understood that the radiuses of both the connecting members 24 and 26 and arcuate rib 20 may be adjusted to accommodate the varying compositions and the varying thicknesses of the tortilla which may be used to form taco shell 10.

As best seen in FIG. 4, radiused connecting members 24 and 26 form a pair of generally parallel elongate ribs 28 and 30 which project below rib 20 and are spaced on either side of raised portion 18. Elongate ribs 28 and 30 respectively define support surfaces 28a and 30a, which, in turn, define a pair of spaced apart, generally parallel line bearing contacts or contact surfaces for taco shell 10. By providing line bearing contact surfaces, potential instability from variations in the surface topology of the taco shell 10, which result from the course or granular nature of the tortilla substrate, is removed and taco shell 10 provides a substantially stable taco shell. In effect, elongate ribs 28 and 30 define two sets of a plurality of spaced apart coplanar support points that are sufficiently close in space and large in number to define two line contacts. In this manner, taco shell 10 is self supporting and stable and remains substantially upright to thereby hold the taco filling in the taco shell when its base 12 is positioned on a substantially planar support surface, for example a table or a counter or a plate.

Figure 5:
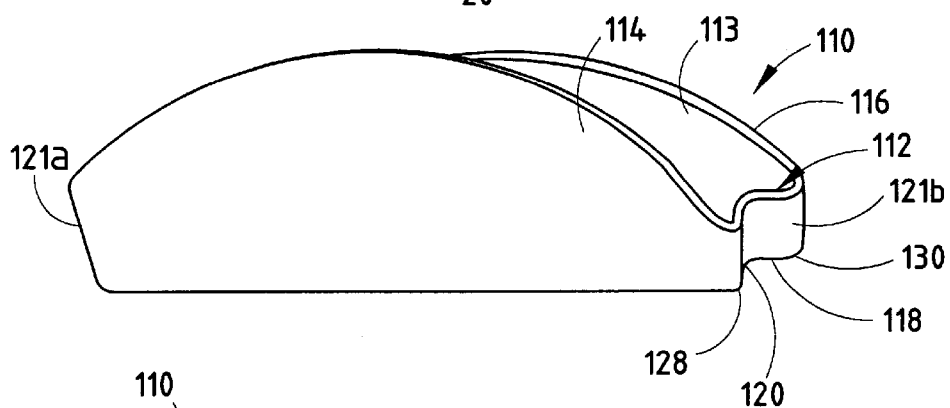
FIG. 5 is a perspective view of a second embodiment of the taco shell of the present invention.
Figure 6:
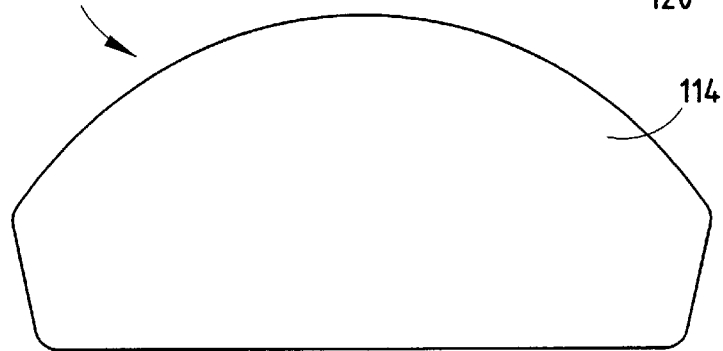
FIG. 6 is a side view of the taco shell of FIG. 5.

Referring to FIG. 5, a second embodiment 110 of taco shell is illustrated. Taco shell 110 is similar to taco shell 10 and includes an improved base 112. Similar to base 12, base 112 permits taco shell 110 to be self supporting and to stand generally upright or vertical without assistance. Taco shell 110 includes a pair of spaced apart semi-circular side walls 114 and 116 which extend from opposed sides 112a and 112b of base 112, respectively. Side walls 114 and 116 project upward from base 112 to form a cavity 113 for receiving a taco filling. Reference is made to taco shell 10 for a description of preferred angular orientation of side walls 114 and 116.

Figure 7:
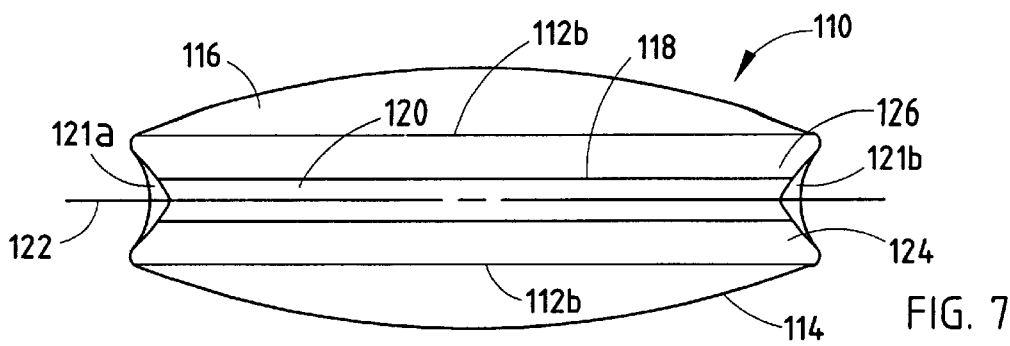
FIG. 7 is a top plan view of the taco shell of FIG. 5.

As best seen in FIGS. 5 and 7, base 112 includes a raised portion 118, which forms an arcuate rib 120. Rib 120 is preferably generally centrally located on base 112. Moreover, rib 120 is preferably generally parallel to a longitudinal axis 122 of base 112. Similar to rib 20, rib 120 may include a uniformly radiused cross-section or may include a varied radiused cross-section. In addition, base 112 includes curved or radiused connecting members 124 and 126 which interconnect arcuate rib 120 and side walls 114 and 116, respectively. Radiused connecting members 124 and 126 are preferably generally parallel to longitudinal axis 122 and rib 120. Similar to the first embodiment, the radius or radii of curvature of connecting members 124 and 126 may be varied as needed.

Referring to FIG. 5, base 112 further includes upturned portions 121a and 121b which extend between side walls 114 and 116. Upturned portions 121a and 121b increase taco shell's 110 ability to retain the taco filling in cavity 113. Furthermore, upturned portions 121a and 121b tend to increase the strength of taco shell 110.

Similar to the first embodiment, radiused connecting members 124 and 126 form a pair of generally parallel elongate ribs 128 and 130 which extend below rib 120 and are spaced on either side of raised portion 118. Elongate rib 128 and 130 respectively define support surfaces 128a and 130a, which define a pair of spaced apart, generally parallel line bearing contacts or contact surfaces for taco shell 110. As described in reference to the first embodiment by providing spaced apart line bearing contact surfaces, potential instability from variations in the surface topology of the taco shell 110 is essentially eliminated and permit taco shell 110 to remain generally upright when placed on a rigid and substantially planar support surface even when filled.

Furthermore, while several forms of the invention have been described and shown, other forms will now be apparent to those skilled in the art. For instance, the shape of the side walls may be varied and the angle of the side walls may be varied. Moreover, the number of ribs may be increased for larger taco shells as needed. Furthermore, the ribs may extend over a portion of the longitudinal extend of the base and, yet, still provide a stable, self-supporting taco shell. The embodiments of the invention shown in the drawings are not intended to limit the scope of the invention which is defined by the claims which follow.

I claim:

1. A stable, self-supporting taco shell comprising:

a circular tortilla having a medial portion and being bent about said medial portion to form a pair of spaced apart semi-circular side walls and a base connecting said side walls and extending inwardly from said side walls to form a U-shaped taco shell having said side walls and said base, said base having a longitudinal extent with said side walls extending along said longitudinal extent, said base including first and second downwardly arcuate portions and an inverted, upwardly arcuate portion, said first and second downwardly arcuate portions extending generaly parallel along said longitudinal extent of said base and inwardly from said side walls, said inverted, upwardly arcuate portion extending along said longitudinal extent and interconnecting said first and second downwardly arcuate portions, and said first and second downwardly arcuate portions forming a pair of spaced apart generally parallel longitudinal support surfaces inwardly of said side walls such that the taco shell, filled or unfilled, is self-supporting and is capable of standing generally vertical on its support surfaces on a generally horizontal and substantially planar support surface without assistance.

2. A taco shell according to claim 1, wherein said base includes a central longitudinal axis, said longitudinal support surfaces being substantially equally spaced from said central portion longitudinal axis of said base.

3. A taco shell according to claim 1, wherein each of said first and second downwardly arcuate portions has a substantially unifomly radiused curvature.

4. A taco shell according to claim 1, wherein said support surfaces are a pair of longitudinally extending ribs.

5. A taco shell according to claim 4, wherein said longitudinal extending ribs define a pair of spaced apart line bearing support surfaces.

6. A taco shell according to claim 1, wherein said base includes at least one upwardly turned end portion for further holding a taco filling in said taco shell.

7. A taco shell according to claim 6, wherein said base includes a pair of opposed upwardly turned end portions for further holding a taco filling in said taco shell.

8. A taco shell according to claim 1, wherein said circular tortilla comprises a corn tortilla.

* * * * *

UNITED STATES PATENT AND TRADEMARK OFFICE
CERTIFICATE OF CORRECTION

PATENT NO. : 5,993,871
DATED : November 30, 1999
INVENTOR(S) : Elden D. Beehler

It is certified that error appears in the above-identified patent and that said Letters Patent is hereby corrected as shown below:

Column 3,
Line 43, please delete "clongate" and insert in lieu thereof -- elongate --.

Column 4,
Line 24, please insert -- , -- after "embodiment".
Line 53, please delete "generaly" and insert in lieu thereof -- generally --.

Column 5, claim 2,
Line 2, please delete "portion" after "central".

Column 5, claim 3,
Line 5, please delete "unifomly" and insert in lieu thereof -- uniformly --.

Signed and Sealed this

Twenty-fifth Day of December, 2001

Attest:

*Attesting Officer*

JAMES E. ROGAN
*Director of the United States Patent and Trademark Office*